3,479,375
NOVEL 19-NOR-TESTOSTERONE ESTERS
Jacob de Visser and Pieter Modderman, Oss, Netherlands, assignors to Organon Inc., West Orange, N.J., a corporation of New Jersey
No Drawing. Filed Oct. 14, 1966, Ser. No. 586,617
Claims priority, application Netherlands, Oct. 28, 1965, 6513946
Int. Cl. C07c *169/22, 167/28;* A61k *17/00*
U.S. Cl. 260—397.4        4 Claims

ABSTRACT OF THE DISCLOSURE

Therapeutic steroid compounds having a very favorable ratio between anabolic and androgenic activity, and also having prolonged activity, are provided by the dicarboxylic acid diesters of 19-nor-testosterone which may also be substituted in the 4-position by halogen or an alkyl group.

---

The invention relates to novel esters of 19-nor-testosterone or derivatives thereof.

More particularly, the invention relates to the novel dicarboxylic acid di-esters of 19-nor-testosterone or of 19-nor-testosterone substituted in 4-position with a halogen atom or with a lower alkyl group.

For about 10 years the development of compounds with anabolic activity and the therapeutic application thereof have expanded enormously. Such compounds are generally applied to combat diseases in which an enhanced breakdown or a decreased building up of body proteins occurs.

The discovery of Kochakian and Murlin in 1935 that testosterone does not only exert an androgenic activity but gives also nitrogen retention was the beginning of anabolic therapy. Testosterone and derivatives thereof have the great disadvantage, however, that on account of their androgenic activity they have a limited field of application only. Hence investigations have been, and are still being, directed to the finding of compounds which exert an anabolic activity, but have no or practically no undesirable androgenic properties, or in other words, which have a favourable ratio between anabolic and androgenic activity. In so far as injection preparations are concerned, such compounds have been found especially in the group of esters of 19-nor-testosterone, of which particularly the 19-nor-testosterone-phenylpropionate and the 19-nor-testosterone-decanoate have proved to be of great therapeutic importance.

Besides a favourable anabolic/androgenic ratio a prolonged activity is also desirable in certain cases.

It has now been found that the dicarboxylic acid di-esters of 19-nor-testosterone or of 19-nor-testosterone substituted in 4-position by halogen or an alkyl group have a very favourable ratio between anabolic and androgenic activity, and that this group of new compounds further exerts a prolonged activity.

Hence the invention is characterized in that 19-nor-testosterone, which may be substituted in 4-position by halogen or an alkyl group, is reacted with an organic dicarboxylic acid or a functional derivative thereof to prepare the corresponding dicarboxylic acid di-esters of 19-nor-testosterone of the derivative thereof substituted in 4-position.

The halogen substituent possibly present in 4-position may be bromine, chlorine or fluorine, preferably chlorine.

The alkyl group possibly present in 4-position is a lower alkyl group with 1–6 carbon atoms, preferably a methyl group. The organic dicarboxylic acids to be applied in the present process are saturated or unsaturated aliphatic dicarboxylic acids, which may be cyclic, branched or unbranched. aromatic dicarboxylic acids and araliphatic dicarboxylic acids. They may also be substituted by for instance halogen, amino groups or etherified or esterified hydroxyl groups.

As examples of acids are mentioned: oxalic acid, malonic acid, succinic acid, adipic acid, suberic acid, brassylic acid, dodecane dicarboxylic acid, hexadecane dicarboxylic acid, glutamic acid, α-bromo-azelaic acid, tetramethyl adipic acid, hexahydrophthalic acids, fumaric acid, maleic acid, mesaconic acid, traumatic acid, phthalic acids and phthalic acids substituted in the benzene nucleus or phenylene acetic acid -β-propionic acid.

The esterification is usually performed by means of the di-halide of the relative dicarboxylic acid, of which the dicarboxylic acid dichloride is to be preferred. The latter derivatives are prepared by reacting the dicarboxylic acid with a chlorinating agent, such as thionyl chloride.

It is also possible to perform the esterification by reacting the 17β-hydroxy-steroid and the free dicarboxylic acid with each other in the presence of a dehydrating agent.

The favourable action of the compounds according to the invention is further illustrated hereinafter by means of comparative pharmacological experiments performed with the 19-nor-testosterone-di-adipinate and the 19-nor-testosterone-phenylpropionate, which latter compound possesses already a very favourable anabolic/androgenic ratio.

The experiments have been performed by administering once, in a dose of 1 mg., to male rats the compounds to be tested, and by measuring after one and after two weeks the increase in weight of the M. levator ani (M.L.A.), which is a measure for the anabolic (myotropic) activity, and the increase in weight of the seminal vesicle and ventral prostate gland, which is a measure for the androgenic activity.

TABLE I

| Compound | No. of rats | M.L.A. | Seminal vesicles | Prostate gland |
|---|---|---|---|---|
| 1×1 mg. 1 week test: | | | | |
| Controls | 6 | 17.2 | 6.9 | 9.3 |
| Phenylpropionate | 6 | 56.2 | 32.6 | 43.2 |
| Adipinate | 6 | 55.4 | 24.4 | 32.7 |
| 1×1 mg. 2 weeks test: | | | | |
| Controls | 6 | 29.3 | 6.8 | 7.9 |
| Phenylpropionate | 6 | 55.7 | 18.4 | 19.5 |
| Adipinate | 6 | 68.3 | 17.3 | 16.3 |

From the above table it appears that after 1 week the anabolic activity of the 2 preparations is practically the same, but that after 2 weeks it is stronger for the adipinate. Further the anabolic/androgenic ratio of the adipinate is in both cases somewhat more favourable than of the phenylpropionate.

The very strong anabolic activity of the dicarboxylic acid di-esters of the 19-nor-testosterone compounds possibly substituted in 4-position and the favourable anabolic/androgenic ratio thereof is most surprising indeed, in view of the fact that the 19-nor-testosterone-mono-esters of dicarboxylic acids, for example the 19-nor-testosterone - hemisuccinate, the 19-nor-testosterone-hemi-adipinate and the 19-nor-testosterine-heminalonate, are virtually inactive in this respect, which is illustrated hereinafter by the results of comparative pharmacological experiments performed with 19-nor-testosterone-phenylpropionate and the 19-nor-testosterone hemisuccinate.

TABLE II

| Compound | No. of rats | M.L.A. | Seminal vesicles |
|---|---|---|---|
| 1 week test: | | | |
| Controls | 6 | 13.0 | 6.0 |
| Phenylpropionate (2×¼ mg.) | 6 | 40.6 | 22.9 |
| Hemisuccinate (2× 2 mg) | 6 | 14.8 | 7.7 |

The 19-nor-testosterone-hemisuccinate administered in a dose eight times higher than the 19-nor-testosterone-phenylpropionate proves consequently to cause hardly any increase in weight of the M.L.A. and seminal vesicles after 1 week.

The invention is further illustrated by the following examples:

EXAMPLE I (A) Preparation of the adipic acid-dichloride

One hundred grams of adipic acid are added to 210 ml. of thionyl chloride, after which the mixture is refluxed for 1 hour. Next the reaction mixture is fractionated in vacuo, to obtain the fraction at 118–120° C./15 mm., the desired adipic acid-dichloride.

(B) Preparation of the 19-nor-testosterone-di-adipinate

Five grams of 19-nor-testosterone are dissolved in 25 ml. of pyridine, after which 5 gm. of adipic acid-di-chloride are added. Next the mixture is stirred for 16 hours at 50° C., after which it is poured into water and extracted with chloroform. The extract is washed successively with water, 2 N sulphuric acid, a solution of 10% sodium bicarbonate and finally with water until neutral, after which it is evaporated to dryness in vacuo. The residue is dissolved in benzene and chromatographed over silicagel, after which the thus obtained compound is recrystallised from acetone to obtain the pure 19-nor-testosterone-di-adipinate.

Elementary analysis.—75.95%; 8.92% H. Calculated: 76.55%; 8.87% H.

EXAMPLE II

By the process described in Example I the 19-nor-testosterone has been converted into the di-esters derived from succinic acid, suberic acid, sebacic acid, hexadecane dicarboxylic acid, traumatic acid, tetramethyl adipic acid and terephthalic acid.

EXAMPLE III

By means of thionyl bromide (100 ml.) malonic acid (60 gm.) has been converted into the malonic acid-dibromide by the process described in Example I.

Analogues to the process described in Example I the 4-chloro-19-nor-testosterone has been converted into the 4-chloro-19-nor-testosterone - dimalonate by means of the thus obtained malonic acid-dibromide, using quinoline as solvent.

Elementary analysis.—Found: 68.43% C; 7.44% H; 10.28% Cl. Calculated: 68.31% C; 7.35% H; 10.34% Cl.

In a analogous manner the 4-chloro-19-nor-testosterone has been converted into the di-esters derived from adipic acid, hexahydrophthalic acid and fumaric acid.

By the processes described in Examples I and III the 4-methyl-19-nor-testosterone has been converted into the di-esters derived from succinic acid, sebacic acid and hexadecane dicarboxylic acid.

We claim:

1. Dicarboxylic acid di-esters of a steroid compound selected from the group consisting of 19-nor-testosterone and 4-X-19-nor-testosterone, wherein X is selected from the group consisting of a halogen atom and a lower alkyl group and the dicarboxylic acid is an organic dicarboxylic acid having 2–18 carbon atoms, both carboxylic acid groups being esterified with said steroid compound.

2. Dicarboxylic acid di-esters of a 17β-hydroxy-steroid selected from the group consisting of 19-nor-testosterone, 4-chloro-19-nor-testosterone and 4-methyl-19-nor-testosterone and the dicarboxylic acid is an organic dicarboxylic acid having 2–18 carbon atoms, both carboxylic acid groups being esterified with said steroid.

3. Novel esters according to claim 1 wherein the dicarboxylic acid is an organic dicarboxylic acid having 2–10 carbon atoms.

4. Novel esters according to claim 1, wherein the dicarboxylic acid is an aliphatic dicarboxylic acid having 2–10 carbon atoms.

References Cited

UNITED STATES PATENTS 2,999,102  9/1961  Huder et al. _____ 260—397.45

FOREIGN PATENTS 841,167  7/1960  Great Britain.

OTHER REFERENCES

Giannini et al., "Boll. Chim. farm," 99 (1950), pages 24–26 and/or Chem. Abst. (1960), vol. 54, par. 11,084(c).

ELBERT L. ROBERTS, Primary Examiner

U.S. Cl. X.R.

260—999